United States Patent [19]
Weinhold

[11] 3,866,956
[45] Feb. 18, 1975

[54] DEVICE FOR THE RELEASABLE FASTENING OF HOSE OR PIPE ENDS

[76] Inventor: Karl Weinhold, Im Jagdfeld 43, 4040 Neuss, Germany

[22] Filed: Apr. 23, 1973

[21] Appl. No.: 353,627

[30] Foreign Application Priority Data
June 22, 1972  Germany............................. 2230464
Mar. 8, 1974  Germany............................. 2310681

[52] U.S. Cl. ............................................. 285/243
[51] Int. Cl. ............................................. F16l 33/00
[58] Field of Search............................ 285/243, 114

[56] References Cited
UNITED STATES PATENTS
2,958,549  11/1960  Spafford ............................ 285/243
3,206,230  9/1965  Weinhold............................ 285/243

Primary Examiner—Patrick D. Lawson
Attorney, Agent, or Firm—Michael S. Striker

[57] ABSTRACT

A device for the releasable fastening of hose or pipe ends comprising two half-shells closed at open end by a lever operated fastener and at the other end by an adjustable connecting means, the half-shells having at least one radially inwardly directed flange for engaging the hose or pipe end.

23 Claims, 10 Drawing Figures

FIG.8
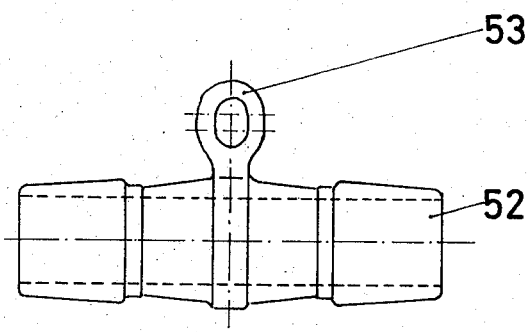
FIG.9    FIG.10
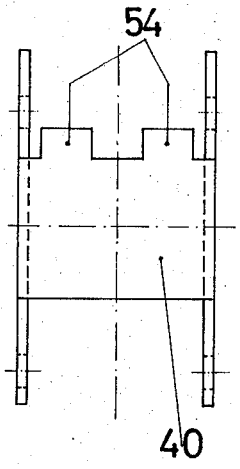
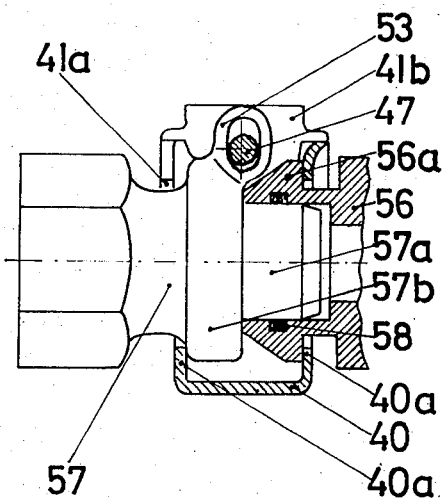

DEVICE FOR THE RELEASABLE FASTENING OF HOSE OR PIPE ENDS

BACKGROUND OF THE INVENTION

The invention relates to a device for the releasable fastening of hose or pipe ends. One such device comprises two half-shells, each connected at one end by means of a pivotal arrangement, which half shells are closable at their other end by means of a lever operated fastener. The half-shells have one or more flanges directed radially inwards on their sides, which flanges serve for engaging the hose or pipe end.

In such devices it is conventionally known to provide the ends of the half-shells, located in the regions of the pivot pin, with at least two hinged arms in each case and to bring these in axial alignment with each other so that the pivot pin penetrates all the hinged arms. The pivot pins were prevented from slipping out in the axial direction by bolting or riveting. In this form of embodiment, the position of the half-shells with respect to each other in the region of the pivot pin was fixed insofar as only a rotational movement about the pivot pin axis was possible. From this resulted the disadvantage that, for example, a hose end to be fastened with the device could differ from a predetermined outer diameter only over a relatively narrow range if, moreover, the holding and sealing function of the device were not to be disadvantageously influenced. Diameter variations occur moreover within certain hose cross-sections, that is to say that the outer diameter of the hose at this position is not accurately circular. The hitherto known devices could not be automatically adapted to such differences. Also, the radial depth of the lateral flange at the half-shell in the region of the joint bolt had to be reduced to a relatively large extent if an efficient function and handling of the device was to be ensured in the case of a limited aperture angle. This limitation results in the case of those forms of embodiment in which the tensioning spring of the lever operated fastener remains connected to the half-shell associated therewith even when the device is open. Another disadvantage resulted in further operational expenditure which was necessary for producing the bores necessary for the pivot pins. These bores had to be made relatively accurately to achieve an efficient guiding and mounting of the pivot pin.

SUMMARY OF THE INVENTION

It is an object of the invention to so construct a device of the type described at the outset that, while providing a possibility for an improved adaptability to different hose or pipe diameters, a simplification of production can be achieved.

According to the invention, there is provided a device for the releasable fastening of hose or pipe ends comprising two half-shells, a lever operated fastener for closing said two half-shells together at one end adjustable means for adjustably closing said two half-shells at the other end and at least one radially inwardly directed flange for engaging the hose or pipe end.

BRIEF DESCRIPTION OF THE DRAWINGS

The invention will now be described in greater detail, by way of example, with reference to the drawings, in which;

FIG. 8 shows a side view of the nozzle;

FIG. 9 shows a view of the lower half-shell as a view from below;

FIG. 10 shows the side view of a further form of embodiment of the device.

DESCRIPTION OF THE PREFERRED EMBODIMENTS

Figure 1:
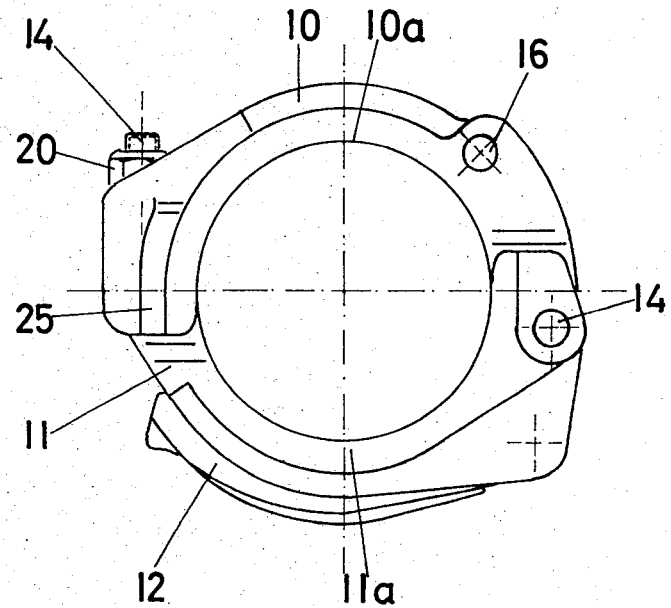
FIG. 1 shows a view of the device as seen in the axial direction.
Figure 2:
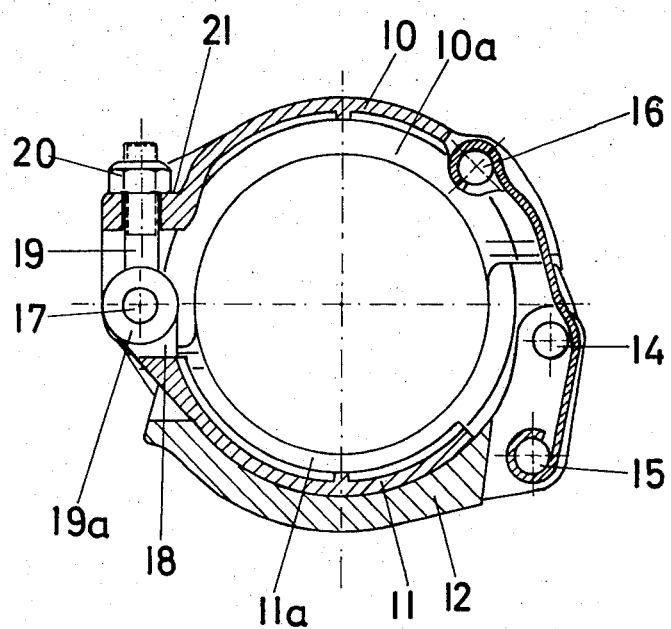
FIG. 2 shows a section along line II—II in FIG. 3.

The invention is suitable for application to a device for the releasable fastening of hose or pipe end having two half-shells connected at one end by a pivotal arrangement which half shells are closable at their other end by means of a lever operated fastener. The half-shells have one or more flanges directed radially inwards on their sides, which flanges serve for engaging the hose or pipe end.

The invention proposes basically that the pivot pin is connected directly only with one of the half-shells and serves as the mounting for a pin provided with a draw eye and extending in the peripheral direction, which pin enters a bore in the end of the other half-shell and is prevented from leaving this bore.

The drilling of hinged arms of both half-shells, which must lie in a definitely predetermined alignment with respect to each other, and are to be entered by the pivot pins, is no longer necessary in the case of the form of embodiment proposed. A simplification in production is achieved already hereby, for the expenditure necessary for producing a single bore in the peripheral direction at the end of one half-shell is relatively low. Also, during the production of this bore, no special requirements regarding accuracy are set, since the half-shells, on closing of the lever operated fastener, substantially adjust by themselves and any stress on the pin occurs substantially only in the peripheral direction in the form of a tensile stress.

Particularly advantageous is the possibility of adaptability to diameters changing within a certain range in the case of the hose or pipe to be secured in each case. The adaptability is to some extent already provided by the self-adjustment possible on a larger scale in the case of the embodiment in accordance with the invention, of the two half-shells with respect to the hose or pipe ends to be fastened. To a further extent, such an adaptability is also provided by a relatively simple changing of the effective length of the pin, particularly in the case of fastening pipe ends due less to the achievement of a radial contact force than to the achievement of an axial retaining action. The change of the effective length can be effected basically by the use of washers or the like together with an arrest, for example, in the form of a rivet, at the end of the pin; however, the construction of the pin as a threaded pin is particularly advantageous, the ends of the half-shells being held together by the tightening of a nut placed on the threaded pin.

Otherwise, not only is a very favourable possibility for changing the smaller inner diameter of the flange in a limited range given, but there exists, in addition, the advantage that such a nut can serve also for the adjustment of the force necessary for closing or opening the lever operated fastener. Thus for example, after closing the lever operated fastener by additional tightening of the nut, a radial contact pressure exerted by the flanges can be amplified. However, it is also conceivable, particularly in the case of larger devices with correspondingly large actuating force, for the operating lever of the operated fastener to facilitate for example the opening of the same by the possibility that the nut is first loosened a little. In many cases, also on tightening the lever operated fastener, the hose is so entrained in the peripheral direction that folding occurs. The latter can be removed again by the tightening of the nut after closing the lever operated fastener, at least to a large extent.

The ends of the half-shells held together by the pin are already substantially fixed with respect to each other in axial direction of the device by the effect of the pin. If, however, a particularly accurate axial adjustment of the half-shell ends with respect to each other is desired, it is appropriate if the ends of the half-shells are so shaped that they engage positively in each other in the axial direction. For this, for example the end of the first half-shell holding the pivot pin can have, on one side, a guide arm extending in the peripheral direction, which arm is separated by a groove from the other end part of this half-shell, in which is found a bore running in the axial direction of the device, for the accommodation of the pivot pin. This groove can again serve for mating a guide arm of the second half-shell, a further guide arm of the second half-shell abutting against the side of the first half-shell remote from the groove. Thus, the two half-shell ends are indented in each other in an approximately bifurcated manner. The two guide arms of the second half-shell can in this case cover the bore accommodating the pivot pins of the first half-shell at both ends, so that the pivot pin need only be inserted loosely in this bore. The draw eye of the pin can be brought into alignment with the bore by a corresponding recess which extends right up to the bore, so that the pin is held by the pivot pin and is swivellable with respect to the axis of the same.

It is further achieved by the proposed fixing of the half-shells to each other that the latter can be displaced with respect to each other on closing the device in the direction of the diameter running through the pivot pin and the lever operated fastener. An adaption for the case where a hose has a different outer diameter inside a certain cross-section or is not exactly circular is thus made possible. An axial guidance of the half-shells with respect to each other is ensured by the described indentation between the said half-shells. If the guide arms are so constructed that they form a circular extension of the flange on the inner side, there remains an uninterrupted course of the flange, even in the case of a different position of the half-shells with respect to each other, on the basis of the necessary adaptation to the outer diameter of the hose in each case. Thus pressure of the hoses against all the parts of the periphery is maintained. Thus, in the course of the flange, there are also no gaps into which the material of the hose is pushed on closing the device, forming folding of the hose.

In the case of a particularly simple form of embodiment of the invention, however, the pivot pins can also be formed or replaced by a corresponding web at the end of the first half-shell, the draw eye of the pin being suspended on the web. Advantageously, a bearing surface, vertical to the direction of the screw pin, is provided on the second half-shell for the nut sitting on the screw pin.

In order to be able to better adjust the half-shell ends in the axial direction with respect to each other, also at the side facing the bolt operated fastener, it is possible for these ends of the half-shells to be provided, in the axial direction of the device guide arms, with projections or the like, engaging in each other in a positive manner. Also, the guide arms now form, at the side facing the lever operated fastener, an identation which ensures a penetration in the peripheral direction of the flange and a correspondingly uniform co-operation of the same with the nozzle also at this position, when the half-shells have to change their position with respect to each other for adapting to a varying hose diameter.

The guide arms should be dimensioned sufficiently long in the peripheral direction that a sufficient positive connection is also present if the ends of the half-shells are raised from each other a little. This can be the case if, for example, a hose or a pipe end of larger diameter is to be held. The shape and arrangement of the flange at the half-shells should be so chosen that at the smallest inner diameter of the device, the device is circular at the flanges, for at least hose or pipe ends with the appropriately provided nominal dimension for the outer diameter to be secured in the device.

In a further development of the invention, it is proposed that a holder, which connects the pin to the nozzle or one of the pipe ends, is put on to the pin, which holder has an eye extending with its axis in the peripheral direction. Thus, the pin is suitable simultaneously for the undetachable fastening of the nozzle or the pipe end to the other parts of the device. Also, the assembly is very simple, for only the pin need by passed through the eye of the holder before the second half-shell is placed positioned relative thereto. This assembly can be effected without any tools. Furthermore, the interchangeability of the first half-shell with the pivot pin fastener, the second half-shell and the holder with the nozzle or the tube end, is ensured by this construction. Thus also an interchange can be effected in such a manner that, for example, a nozzle service to join two hose ends can be interchanged for a pipe end provided with a collar, which forms a rigid connecting adaptor and converts into a nozzle for pushing over a hose end. A further advantage is given in that, particularly also devices with very large dimensions are transported in this manner, stored or caused to be despatched, in such a manner that the two half-shells are lain one in the other. Considerable space saving is achieved hereby.

The holder can be either a correspondingly shaped separate constructional part, which is placed on the nozzle or the tube end and is there held in a suitable manner. However, it is also conceivable to secure an eye on the pipe end or the nozzle, in corresponding alignment, by welding or soldering, so that the eye forms the holder for itself. Advantageously, the eye has the shape of an oblong hole, by which the possibilities for the radial self-adjustment between the nozzle or the pipe end on the one hand and the other parts of the device on the other hand are improved.

According to a further proposal of the invention, a simple fixing in the axial direction between the nozzle or the pipe end, on the one hand, and the half-shell of the device, on the other hand, can be achieved by cam-like extensions extending in the peripheral direction on one of the two half-shells which form axial stops on both sides of the draw eye.

Referring now to the drawings, in the embodiment according to FIGS. 1-4, the device comprises substantially two half-shells 10 and 11, which are provided on their two sides in each case with radial flanges 10a or 11a, and a lever operated fastener formed from an operating lever 12 and a tension spring 13. The operating lever 12 is pivotally fastened by means of a pin 14 to one end of the half-shell 11, while the tensioning spring 13 is secured with its end to the operating lever 12 by means of a pin 15; the other end of the tensioning spring 13 is bent up in a hook-shaped manner and suspended on a pin 16, which is connected to the half-shell 10. The closure operates like a toggle type fastener because of this construction.

A pivot pin 17 is held in a corresponding bore at the end of the half-shell 11 opposite this fastening. The central region of this half-shell end is provided with a notch 18, in which an eye-shaped draw eye 19a of a threaded pin 19 so engages that the pivot pin 17 passes there through. The threaded pin 19 passes through a bore in the abutting end of the half-shell 10 in an approximately tangential direction; a nut 20 is screwed on to the threaded pin 19, which nut lies on a bearing surface 21 extending vertically to the threaded pin 19.

The end of the half-shell 11 holding the pivot pin 17 has, at one of its sides, a guide arm 22 which is separated from the other part of its half-shell by a groove 23. Into this projects a correspondingly dimensioned guide arm 24 of the half-shell 10, while a further guide arm 25 of the half-shell 10 abuts at the opposite side of this end of the half-shell 11. The bore containing the pivot pin 17 is therefore closed on both sides, so that the pivot pin 17 cannot slip out. The length of the guide arms 22, 24 and 25 is such that this covering and a positive guiding in the axial direction is also maintained if the two half-shells 10 and 11 are not pressed together so far by the tightening of the threaded screw 20, that the front face of the guide arm 24 comes to bear on the inner front face of the groove 23.

Instead of the pivot pin 17, also a web bridging the notch 18 can be provided, in which web is suspended a hook-shaped draw eye of the screw pin 19. The capacity to withstand stress, resulting from this, in the tangential direction can, however, be somewhat less in some cases.

Figure 3:
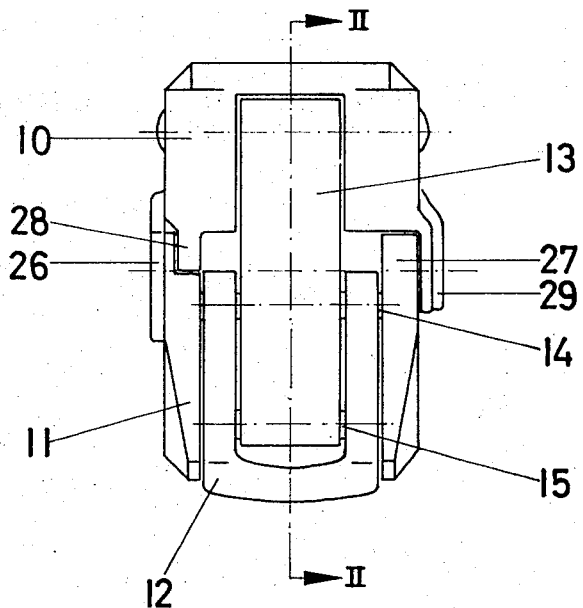
FIG. 3 shows a view of the device seen in the direction of the bolt lever fastener.
Figure 4:
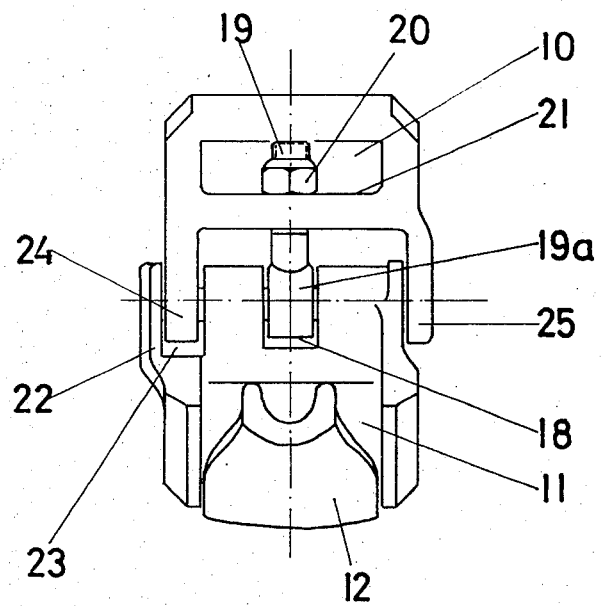
FIG. 4 shows a view of the device, seen from the opposite side with the pivot pin and the draw eye pin.

As can be seen from FIG. 3, the operating lever 12 is constructed in a bifurcated manner at its end facing the bolt 14, so that it can engage on both sides of the tension spring 13 at the bolt 14. Also, the ends of the half-shells 10 and 11 are so constructed at the fastener side that a fixing between the half-shells is given in an axial direction by a positive engagement. Guide arms 26 and 27, on the half-shell 11 and corresponding guide arms 28 and 29 on the half-shell 10, engaging in each other, serve for this purpose.

Figure 5:
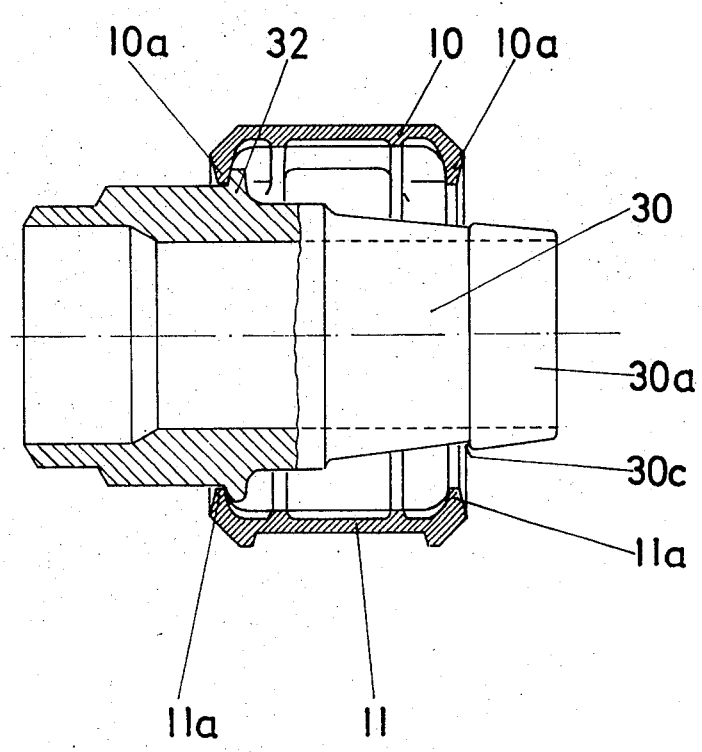
FIG. 5 shows an axial section through the device.

As can be seen from FIG. 5, the half-shells 10 and 11 enclose a pipe-shaped connecting piece 30, one side of which is constructed as a nozzle 30a for pushing open a hose end when the device is closed. This nozzle 30a has a bulge 30c behind which the hose end is pressed and clamped by the flange 10a and 11a against the nozzle 30a.

The connecting piece 30 has a collar 32 which, when the device is closed, is engaged behind the flanges 10a and 11a, so that any removal of the half-shells 10 and 11 by an axial tensile stress of the hose end is not possible.

Figure 6:
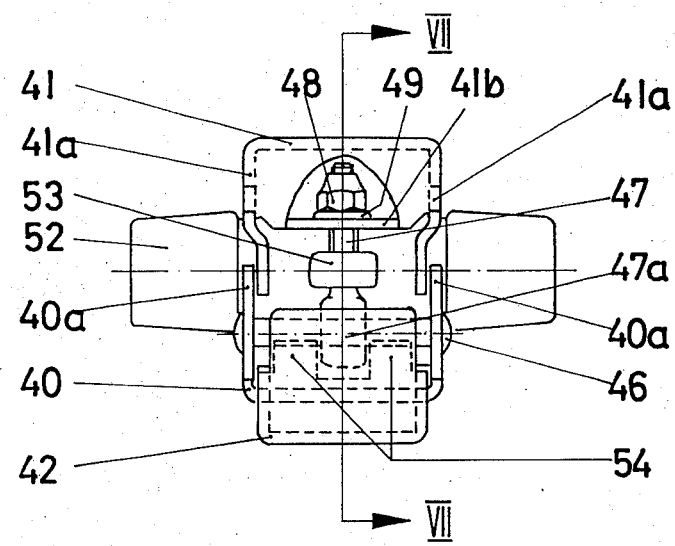
FIG. 6 shows a side view of another form of embodiment of the device.
Figure 7:
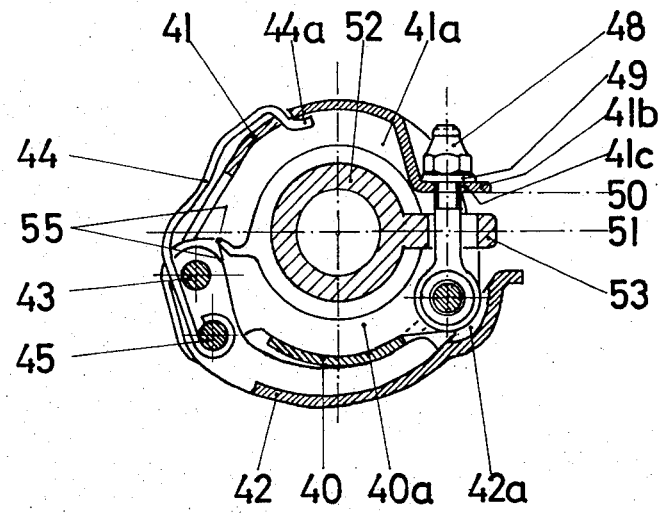
FIG. 7 shows a section along the line VI—VI in FIG. 1.

As can be seen from a further form of embodiment in accordance with FIGS. 6 and 7, the device has a lower half-shell 40 and an upper half-shell 41, which in each case are provided on both sides with radial clamping flanges 40a or 41a. A operation lever 42 which is connected by means of a pivot pin 43 to the lower half-shell 10, and a tension spring 44 which is secured at one end to another pivot pin 45, serve to open and close the device while it is engaged with its opposite hook-shaped end 44a in the upper half-shell 41.

On the side opposite this lever operated fastener, the lower half-shell 41 has a pivot pin 46 which passes through a draw eye 47a of a pin 47 provided with a thread at its free end. A nut 48 is screwed on to the pin 47; between it and a bearing surface 41b of the upper half-shell 41 there is a washer 49.

The bearing surface 41b has, as compared to a chord 50 shown here by a chain line, which is parallel to the diameter 51 intersecting the two ends of the upper half-shell 41 and through the contact point of the bearing surface 41b on the half-shell 41, a slight inclination so that an outwardly opening angle is given which here has a value of 1.5°.

The device further has a nozzle 52 at its two ends for pushing open, in each case, a hose, the shape of which nozzle can be best seen from FIG. 8. An eye 53 is positioned on the nozzle 52 as a holder extending in the radial direction, which eye has the shape of an oblong hole extending in the radial direction. The pin 47 passes through this eye 53 so that the nozzle 52 is undetachably connected to the other parts of the device as long as the nut 48 is screwed on to the pin 47.

As can be best seen from FIG. 9, the lower half-shell 40 has, at its end carrying the pivot pin 46, the two cam-like extensions 54 extending approximately in the peripheral direction, which extensions are so arranged and shaped that they extend on one side of the draw eye 47a in each case and thus serve as axial stops for the draw eye 47a. Thus, the nozzle 52 can be fixed in a certain axial position through the extensions 54 by means of the eye 53 and the extensions 54 to the clamping flanges 40a and 41a of both half-shells 40 and 41, so that the clamping flanges 40a and 41a in each case engage at a quite different position of nozzle 52 on the outer side of a pushed-on hose end and the best possible sealing effect can be achieved.

The bore 41c located in the bearing surface 41b, for guiding through the pin 47, likewise has the shape of an oblong hole so that a displaceability of two half-shells 40 and 41 with respect to each other is given in the radial direction without the pin 47 being clamped in a distrubing manner in the case of a possible rotation about its pivot pin 46 in the region of the bore 41c or exerting bending moments on the bearing surface 41b. A further possibility for self-adjustment between the nozzle 52 and the clamping flanges 40a and 41a in the radial direction is given by the oblong hole shape of the eye 53.

The bolt lever 42 has a bowed out portion 42a in the region of the draw eye 47a, which bowed out portion makes possible a better abutment of the closed operating lever 42 against the lower half-shell 40.

The possibilities for an automatic adaptation to a hose diameter differing from a prescribed nominal measurement and/or fluctuation inside certain cross-sectional planes, given by the oblong hole shape of the eye 53 and the bore 41c, have already been described. Thus, in this connection, a radial displacement between the ends of the half-shells 40 and 41 located in the region of the lever operated fastener is possible, the bearing surfaces of which half-shells have the shape shown in FIG. 7. When the half-shells are closed with the help of the pivot pin fastener, initially a certain displaceability is given at this position in both radial directions. The displaceability of the upper half-shell 41 with respect to the lower half-shell 40 in the direction of the tension spring 44, however, is limited by a corresponding forming of the said bearing surface. At the latest, on achieving this limitation the appropriate bearing surfaces 55 form a rotational point at which the two half-shells 40 and 41 can roll over each other according to the movement clearance given in dependence on the position of the threaded nut 48 on the pin 47.

The pivot pin 46 serving as the mounting for the pin 47 is a rivet in the present case, which passes through corresponding holes in the lower half-shell 40. However, it is also conceivable, for example, in the case of half-shells made as cast parts, to support the pivot pins on both sides in two bores of relatively large axial length and to dimension its cross-section such that it is held by friction alone after insertion into the bores. In addition to the advantages named above, there arises here the advantage that the procedure needed with the rivets can be dispensed with.

In the case of the form of embodiment according to FIG. 10, a pipe end 56 and a connecting adaptor 57 are connected together by the device. The latter has a push-in part 57a which is pushed into a sleeve part 56a on the pipe end 56 and is sealed thereagainst by a ring seal 58. The flanges 40a and 41a at one side of the half-shells 40 and 41 engage behind the collar-like sleeve part 56a on its outer periphery, whereas the flanges 40a and 41a located on the other side of the half-shells 40 and 41 lie behind a collar 57b of the connecting adaptor 57. The eye 53 serving to connect the half-shells 40 and 41 to the connecting adaptor 57 or the pipe end 56 is put on the collar 57b.

It will be understood that the above description of the present invention is susceptible to various modifications changes and adaptations.

What is claimed is:

1. A device for releasbly fastening of hose or pipe ends, comprising two half-shells; a lever operated fastener for closing said two half-shells at one end; and adjustable means for adjustably closing said two half-shells at the other end, said adjustable means comprising a pin pivotally mounted at one end on one of the half-shells and extending into a bore provided in the other half-shell, and means for retaining said pin in said bore.

2. A device as defined in claim 1, wherein said pin comprises a draw eye pin having an eye at said one end thereof, and including a pivot pin mounted in said one half-shell and extending through said eye for pivotally mounting said draw eye pin on said one half-shell.

3. A device as defined in claim 1, and including at least one radially inwardly directed flange on each of said half-shells for engaging the hose or pipe end.

4. A device as defined in claim 2, wherein said draw eye pin comprises a threaded eye pin and said retaining means comprises a nut screwed onto said threaded pin.

5. A device as defined in claim 4 and comprising means on said half-shells for positive engagement between said half-shells in an axial direction.

6. A device as defined in claim 5 and comprising a guide arm extending perpherally from one side of said one half-shell carrying said pivot pin and defining a groove between itself and an end portion of said one half-shell defining a bore for receiving said pivot pin.

7. A device as defined in claim 6, and comprising a first guide arm on said other half-shell for engagement between said guide arm of said one half-shell and said one portion of said one half-shell and a second guide arm on said other half-shell for engagement with a side of said one half-shell remote from said guide arm of said one half-shell.

8. A device as defined in claim 7, wherein said first and second guide arms of said other half-shell comprise arms extending over both ends of the bore defined by said one half-shell for receiving said pivot pin.

9. A device as defined in claim 8, wherein said other half-shell defines a bearing surface at right angles to said threaded eye pin for engagement by said nut.

10. A device as defined in claim 8, and comprising further guide arms on said half-shells at their ends closed by said lever operated fastener for positive axial connection.

11. A device as defined in claim 10, wherein said guide arms and further guide arms comprise extended arms to provide positive axial connection between said two half-shells when said two half-shells define a small separation therebetween.

12. A device as defined in claim 4, wherein said other half-shell defines a bearing surface for said nut extnding at an angle of 1° to 3°, opening outwardly, to a chord parallel to a diametral plane intersecting both ends of said other half-shell when said device is closed and extending through the contact point of the bearing surface with the said other half-shell.

13. A device as defined in claim 4, and comprising means for preventing unintentional removal of said nut from said eye pin by unscrewing said nut.

14. A device as defined in claim 4, and comprising a bowed out portion on the operating lever of said lever operated, fastening for accommodating said eye of said eye pin.

15. A device as defined in claim 3, and comprising two said radially inwardly directed flanges.

16. A device as defined in claim 15, wherein said flanges comprise flanges defining a circular aperture when said device is closed in its smallest adjusted state.

17. A device as defined in claim 2 and comprising a hose nozzle or pipe end for positioning between said two half-shells and an eye member on said hose nozzle or pipe end defining an aperture whose axis extends in the peripheral direction of the device and being engaged on said draw eye pin.

18. A device as defined in claim 17, wherein said eye member defines an oblong aperture extending radially of said device.

19. A device as defined in claim 2 and comprising means for axially retaining said eye of said draw eye pin on said pivot pin.

20. A device as defined in claim 19, wherein said retaining means comprises cam like extensions on one of said two half-shells, extending substantially in the peripheral direction and forming axial stops on both sides of said eye.

21. A device as defined in claim 19, wherein said retaining means comprise cam like extensions on said one of said half-shells extending substantially in the peripheral direction and forming axial stops on both sides of said eye.

22. A device as defined in claim 2, wherein said other half-shell defines an oblong aperture forming said bore for permitting swivelling movement of said draw eye pin.

23. A device as defined in claim 2, wherein said two half-shells define, at their ends away from said pivot pin, bearing surfaces to enable said half-shells to roll on each other at least within a small range.

* * * * *